(12) United States Patent
Drobek

(10) Patent No.: US 7,522,720 B2
(45) Date of Patent: Apr. 21, 2009

(54) METHOD FOR MANAGING DATA IN AN AUTOMATIC CALL DISTRIBUTION SYSTEM

(75) Inventor: Erich Drobek, Unterhaching (DE)

(73) Assignee: Siemens Enterprise Communications GmbH & Co. KG, Munich (DE)

(*) Notice: Subject to any disclaimer, the term of this patent is extended or adjusted under 35 U.S.C. 154(b) by 886 days.

(21) Appl. No.: 10/656,870

(22) Filed: Sep. 8, 2003

(65) Prior Publication Data

US 2004/0125939 A1     Jul. 1, 2004

(30) Foreign Application Priority Data

Sep. 6, 2002   (DE)   ................ 102 41 358

(51) Int. Cl.
*H04M 3/00*   (2006.01)
(52) U.S. Cl. ............... 379/265.02; 379/265.09; 379/265.12; 379/265.13
(58) Field of Classification Search ............ 379/265.02, 379/265.09, 265.12, 265.13, 908
See application file for complete search history.

(56) References Cited

U.S. PATENT DOCUMENTS

| | | | |
|---|---|---|---|
| 5,008,930 A | | 4/1991 | Gawrys et al. |
| 5,546,455 A | * | 8/1996 | Joyce et al. ............ 379/265.03 |
| 5,757,904 A | | 5/1998 | Anderson |
| 5,884,032 A | * | 3/1999 | Bateman et al. ............. 709/204 |
| 5,937,051 A | | 8/1999 | Hurd et al. |
| 5,960,073 A | * | 9/1999 | Kikinis et al. .......... 379/265.04 |
| 6,477,559 B1 | * | 11/2002 | Veluvali et al. ............. 718/101 |
| 6,724,869 B2 | * | 4/2004 | Chapman et al. ......... 379/93.01 |
| 2002/0032809 A1 | | 3/2002 | Bateman et al. |
| 2003/0097339 A1 | * | 5/2003 | Funck et al. .................. 705/64 |

FOREIGN PATENT DOCUMENTS

| | | |
|---|---|---|
| DE | 43 30 031 A1 | 9/1994 |
| EP | 0 633 685 A2 | 1/1995 |
| WO | WO 96/14704 | 5/1996 |
| WO | WO 98/49809 | 11/1998 |
| WO | WO98/49809 | 11/1998 |
| WO | WO 99/51015 | 10/1999 |
| WO | WO 00/72562 A1 | 11/2000 |

OTHER PUBLICATIONS

Paszkowsky, "Details on Display", Telecom Report 2.97, pp. 38-39, 1997.
Lieb et al., "Daten und Fakten zum Pilotzersuch", Telecom Report 2.97, pp. 38-39, 1997.

* cited by examiner

*Primary Examiner*—Curtis Kuntz
*Assistant Examiner*—Karen L Le
(74) *Attorney, Agent, or Firm*—Staas & Halsey LLP

(57) ABSTRACT

A method for managing CTI data in an automatic call distribution ACD is described. In this case, caller data is determined by a call center forwarding CCR and/or an interactive voice response unit is transmitted to a CTI instance CTII for forwarding control, with customer data being extracted from a customer database KDB and entered in a customer data document KDD to which access takes place from an agent workstation AWP.

18 Claims, 2 Drawing Sheets

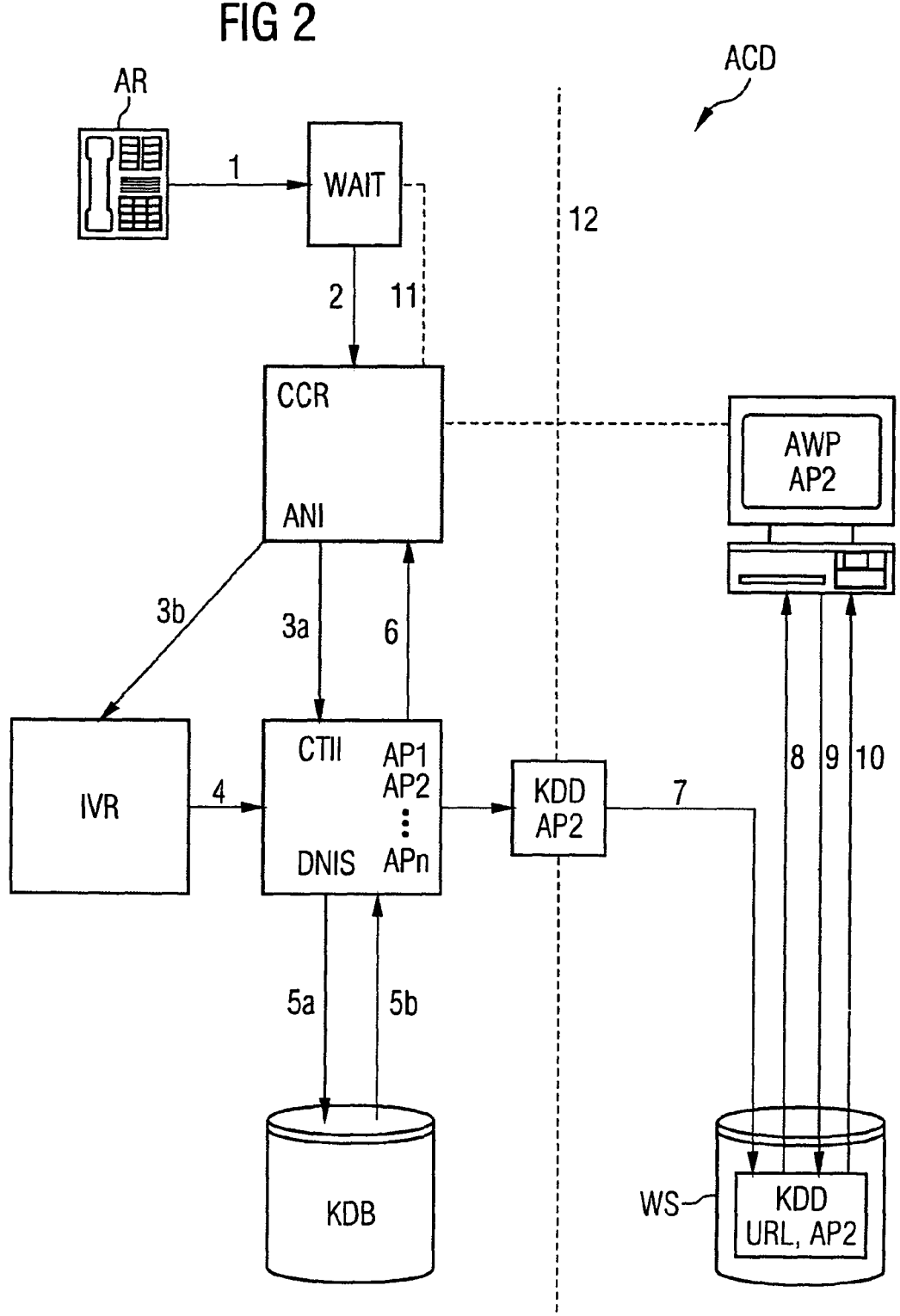

METHOD FOR MANAGING DATA IN AN AUTOMATIC CALL DISTRIBUTION SYSTEM

CROSS REFERENCE TO RELATED APPLICATIONS

This application is based on and hereby claims priority to German Application No. 102 41 358.4 filed on Sep. 6, 2002, the contents of which are hereby incorporated by reference.

BACKGROUND OF THE INVENTION

The invention relates to managing data in an automatic call distribution.

CTI methods and procedures for automatic call distribution are used particularly for the operation of call centers. CTI in this case is an abbreviation for "Computer and Telephone Integration" and is a collective term for telephonic communication applications to enable telephone calls to be more easily managed with the aid of a personal computer. This collective term covers basic functionalities such as selecting data from a database, recording notes during a call or displaying call notes, that in addition to other work procedures are fundamental for the operation of call centers.

ACD (Automatic Call Distribution) is used for the distribution and management of calls within a call center for and at individual workstations. The technical term ACD in this case describes a powerful application of the CTI principle to a call center architecture and includes a standard range of basic performance features such as queuing field control, alternative routing control, announcements, music superimposition, call distribution to ACD agents, creation of statistics and other features.

Individual workstations in call centers and employees at these workstations are designated as agents, ACD agents or agent workstations. The term agent in this case describes an employee in a call center, whereas the term ACD agent refers to the hard and software equipment of the workstation in the call center and expresses the connection and networking of individual workstations in the higher-level structure of the ACD (Automatic Call Distribution). In the following, the term "agent workstation" is used as a synonym for the term "agent" or "ACD agent", unless otherwise stated.

ANI (Automatic Number Identification) is a further basic term. This term refers to a performance feature of a call number identification of a caller in a switched network, for example in an ISDN network.

The term IVR (Interactive Voice Response Unit) is frequently used in the area of the devices and equipment of a call center. This term covers all of the procedures and components required to perform an automated voice-supported telephone dialogue using a telephone keypad. The term interactive voice response unit and the abbreviation IVS used in this technical field then describes both the method and the components and procedural steps required for it.

Furthermore, a DNIS service is spoken of in the following connection. DNIS means Dialed Number Identification Service and describes a service used essentially to generate a sequence of characters that displays a number dialed by a caller and, furthermore, determines how the call to the call center is to be processed. The DNIS service, for example, determines whether a call is to be forwarded to an order receiving service or a technical service within the call center.

According to the related art, calls to call centers are essentially processed in that the incoming calls are sent through to individual agents of the call center by ACD and passed on to the agent with the customer data linked to the caller data. The data required for this is taken from an existing database of a business. This data usually includes existing business connections of the company and of the caller. This business-relevant information is provided to the agent through the caller by a monitor at his workstation. This procedure of coupling and ACD switching and displaying business-relevant caller information is called "screen popup".

This coupling is achieved in that accompanying information is sent to the ACD agent parallel to the ACD forwarding. The accompanying information mainly contains data from an ANI identification, parameters from a DNIS service or data from the IVR unit. On the basis of this information, the terminal of the ACD agent searches the existing database for information suitable for the caller and displays this on a monitor in the ACD workstation.

A procedure of this kind has some series disadvantages and inadequacies. A first disadvantage is that access to caller data is only possible when the call has actually been put through to the ACD agent and accepted there. If there is a heavy load on the call center in main call period or there is a large number of calls, it often means that a considerably amount of time is required, which is particularly irritating for the caller, because he is sometimes assigned to a queue when his call has already actually been put through to the relevant ACD agent, because the customer data is not yet available at the ACD agent.

A further disadvantage is in the absence of data security, because the ACD agent must be allowed full access rights to the database of the company. Because many businesses do not operate their own call centers but instead transfer operations of this kind to other service providers for reasons of cost or operational considerations, this means that the service provider has full access to the internal data of the company. A procedure of this kind is undesirable for reasons of data protection and the protection of business secrecy and should if possible be avoided. The same applies to workstations in teleworking procedures. There is also in this case a considerable security risk with state of the art procedures.

SUMMARY OF THE INVENTION

Against this background, one possible object of the invention is to provide a method and a system for the managing CTI data in an automatic ACD that largely avoids the stated disadvantages and problems.

The basic concept of the method is to first take caller data from an incoming call at a call center forwarding and/or interactive voice response unit, to then switch this to a CTI instance for forwarding control and finally to determine customer data from a customer database by the CTI instance on the basis of information from the caller data, with the customer data document then being accessed from an agent workstation, regardless of whether the call has actually been put through to the agent workstation.

With a method of this kind, customer information is determined from the customer database on the basis of incoming caller data and is prepared, without the caller having to be put through to the agent workstation. It is sufficient that the call center forwarding has received the call and identified the caller. The customer data of the caller is taken from the customer database on the basis of this identification and is transferred to a document that is then provided on call to the relevant agent at the agent workstation regardless of whether the call has been put through. This guarantees on one hand that the forwarding and putting through is decoupled from the determination of the customer data and on the other hand no direct access to the customer database is possible from the agent workstation. The agent does not receive the customer data directly from the customer database, but instead from a customer data document generated from the customer data and accesses only this. This means that operationally a type of "temporary customer database" is generated and processed that can be managed from the agent workstation without it being possible for the agent to access the actual "internal customer database" provided by the company.

This means that a clear assignment of the created customer data document to an agent workstation or to an agent with a special work task is basically assured in two ways.

With the first type of assignment of the created customer data document to the particular agent workstation, graded access rights are used. For this purpose, a previously specified agent profile is activated during a booking-in process of an agent and/or an agent workstation, that contains previously-specified access rights to the customer data document. The CTI instance then creates a suitable customer data document on the basis of the activated agent profile, with access to the data of this customer data document taking place via the agent workstation.

With a second type of assignment, an agent profile is also activated using access rights specified in advance, with all of the customer data documentation showing the customer data suitable for different agent profiles and access rights to customer data documents being created at the same time by the CTI instance. Access from an agent workstation is then possible only to that customer data document the access rights of which correspond to the particular agent profile.

The agent profile thus performs two functions. On one hand it specifies the work area a relevant agent processes and what data must be transferred from a customer data document for this purpose. This also means that the access rights of individual agents are delineated from each other. The work area and access rights thus correspond to each other and can be hierarchically arranged. In particular, this makes agent profiles possible corresponding to the status of a "group leader", an "individual processor of a first work area", an "individual processor of a second work area" and so on. This ensures that individual customer data documents can be processed only by a specified and controllable circle of agents. It is more appropriate if this takes place in harmonization with the structure of call center sub departments, agent work groups, groups of individual agents, logical organizations of the customer database and other similar logistic or security requirements.

Furthermore, an access address that refers to a memory area occupied by the customer data document is provided using the agent profile based on the access rights specified for the relevant agent workstation. This ensures that only information on an available customer data document is sent to the particular agent workstation that actually has a right of access to that customer data document. This arrangement thus additionally guarantees optimization of the management of the customer data documents, avoidance of unnecessary data transmissions and an increase in the data security between the various sub departments or hierarchies of the agent workstations when processing the data of customer data documents.

It is more suitable if when a large amount of calls come into the call center, or if a few calls from the same caller arrive regularly and repeatedly at the call center, if the customer data document is buffer stored in a working data memory. Access to the working data memory and thus to the customer data document then takes place from the agent workstation. The working data memory thus provides a storage facility or "database" for customer data independent of the customer database, to which access can be made independent of the customer database. This relieves the load on the customer database and also protects it against the risk of undesirable access from agent workstations.

Alternatively, the customer data document can be provided directly to the agent workstation without buffer storage. The buffer storage has the advantage that certain amounts of data that are constantly repeated or the amount of which essentially remains the same, can be continuously renewed or always available for access. This naturally requires extra technical cost because the storage devices must be provided. The provision of the customer data documentation without buffer storage guarantees a faster processing sequence but is more expensive particularly in the case of complicated operations in the call center associated with the transmission of large amounts of data.

A particularly advantageous possibility of creating the customer data document is for a customer data document in the form of a HTML document to be created by the CTI instance from the customer database on the basis of the caller data. Access to the HTML document can take place from the agent workstation using the known versions of a HTML browser.

With a buffer storage of a HTML document created in this way, the working data memory part is a webserver and the access address is assigned to the HTML document as a URL address. The URL address is transmitted to the agent workstation by the CTI instance or the call center forwarding. As already described, the transmission of the URL address can be controlled by access rights corresponding to the agent profile.

A system for an automatic call distribution for implementing the method is a CTI instance for forwarding control, to which a device for creating customer data documents is assigned.

The CTI instance in this case is additionally fitted with a device for converting caller data to search parameters relevant to the caller for a search of customer data in the customer database.

Furthermore, the CTI instance has a converting device for converting a first data format of customer data of the customer data document available independent of the customer database.

The CTI instance or the call center forwarding also has a device for transmitting the created customer data document to a working data memory that has a communicating connection to the call center forwarding or CTI instance.

Also assigned to the call center forwarding or CTI instance is a device for forwarding the customer data document and/or the access address of the customer data document to the agent workstation.

For forwarding control, the CTI instance is also fitted with a converting device for converting caller data from an automatic call number identification to search parameters for searching customer data in the customer database. This converting device provides a correlation between the caller data and the customer data associated with the caller and the agent profile matching this customer data and one hand enables the correct customer data to be determined from the customer database and on the other hand the relevant agent for this to be determined.

In a further appropriate embodiment of the CTI instance, it has a converting device for converting caller data from an automatic telephone dialogue of an interactive voice response unit into search parameters for searching customer data in the customer database.

In a third suitable embodiment of the CTI instance, a converting device is provided for converting caller data from a DNIS system into search parameters for a search of customer data in the customer database.

Furthermore, an assignment device is provided by which the caller data and the customer data of a caller combined in the customer data document are assigned a single agent profile or a totality of the agent profiles. The assignment device particularly specifies access rights for individual agents to individual customer data documents and thus defines which agent is responsible for the further processing of the customer data document.

Furthermore, a device is assigned to the CTI instance for converting customer data from the data format of the customer database to a data format of a markup language of the customer data document, particularly to the data format of the HTML markup language.

The device for creating an access address is advantageously formed as a device for creating a URL address. A data format in the HTML markup language in conjunction with an address given in the form of a URL represents a standard that is widely used at present for data transmission and can be used with all available operating and computing systems. A system of this kind is also particularly advantageous because in this case the proven widely-used Hypertext protocol can be accessed. Furthermore, standard means can be used in such a protocol or server device to provide access rights, which means that the cost of implementing the method for managing the CTI data in an existing call center architecture is substantially reduced.

Alternatively, a URL address is permanently assigned to the agent workstation and the customer data document created by the CTI instance as a HTML document is stored in a server assigned to the agent workstation. When the caller is connected to the agent workstation an "update" function is triggered on the server and this causes the customer data document provided for the caller to be opened.

Under these conditions, the working data memory can be designed as a webserver completely external to the components of the automated call distribution, that has a communicating connection both with the CTI instance and/or the call center forwarding and to the agent workstation.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 is a block diagram showing basic procedural sequences and components of the method using a second embodiment of a system of an automatic call distribution as an example.

DETAILED DESCRIPTION OF THE PREFERRED EMBODIMENTS

Figure 1:
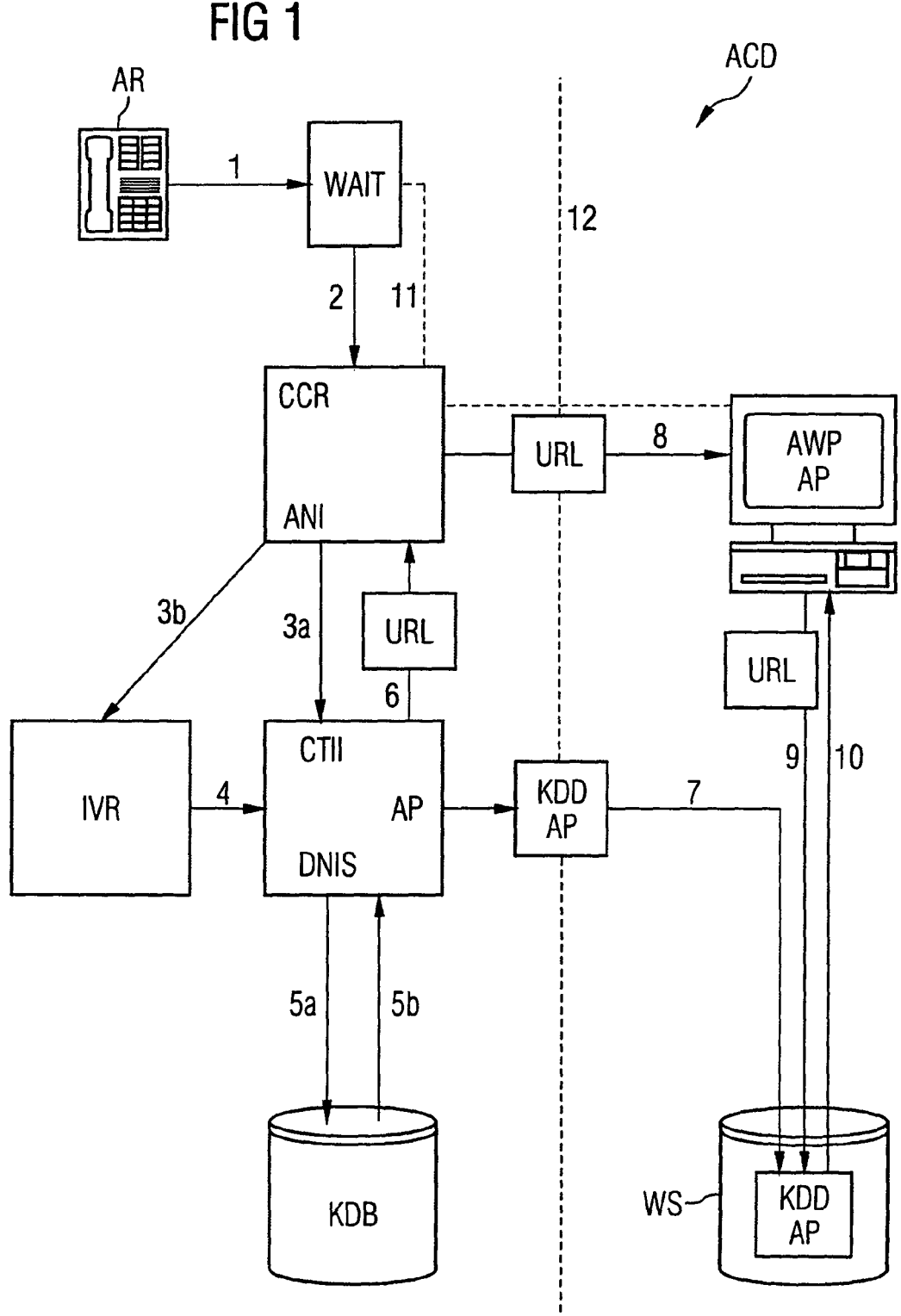
FIG. 1 is a block diagram showing basic procedural sequences and components of the method using a system of an automatic call distribution as an example.

Reference will now be made in detail to the preferred embodiments of the present invention, examples of which are illustrated in the accompanying drawings, wherein like reference numerals refer to like elements throughout.

The same reference characters are used for the same procedural sequences and components of the method.

The following representation is based on a customer data document KDD created in the form of a HTML document. The access address is realized by a URL address URL. The access rights of the agent or agent workstation are specified in advance by agent profiles AP1, AP2, ..., APn.

The customer data document KDD is stored in a webserver WS containing the working data memory. The automatic call distribution ACD has a WAIT loop, a call center forwarding CCR, a CTI instance CTII for forwarding control, an interactive voice response unit IVR and a memory device with a customer database KDB as its components.

The CTI instance CTII has software and/or hardware components for generation of an access address in the form of the URL address URL. Furthermore, an agent profile AP is preset as an example in the CTI instance CTII. The CTI instance CTII contains means for formatting a data format of a customer database KDB into a HTML-based customer data document KDD. The CTI instance CTII is also equipped with a usual DNIS service for identification of numbers dialed by the caller.

Furthermore, the call center forwarding CCR has an automatic call number identification ANI and thus has a communication connection both with the CTI instance CTII and the interactive voice response unit IVR. The interactive voice response unit IVR in this case is used to handle the automated telephone dialogue and an associated generation of IVR items, as they are called, that also contribute to a specification of the search function of the CTI instance CTII in the customer database KDB.

At the start of the process, a caller AR establishes a connection to the call center in step 1. In the example shown here, his call is first sent from the ACD components to a queue WAIT, with its call number being identified by the automatic number identification ANI.

In a first example of an embodiment, it is assumed that the queue WAIT is activated during the succeeding complete procedural sequence and the caller AR is not put through to the agent workstation AWP. The example of the method shown here first therefore assumes that the ACD equipment is momentarily overloaded and for this reason a call cannot be put through. The method is, however, in no way limited to this example of an application and can also be realized if an immediate connection between the caller AR and agent workstation AWP occurs.

While the queue WAIT is active, the call, in a procedural step 2, is put through to the call center forwarding CCR that undertakes an automatic call number identification ANI. The result of the automatic call number identification ANI is communicated in procedural step 3a, to the CTI instance CTII for forwarding control. The information of the automatic call number identification ANI in this case contains at least the call number of the caller AR and enables a clear identification of the caller AR to be made using this. The CTI instance CTII uses this identification to generate search parameters, and on the basis of the search parameters performs a search operation 5a within the specified customer database KDB, with the caller-related customer data being extracted in procedural step 5b. The data of an agent profile AP is taken into account for this. The agent profile AP contains information on the work area of the agent and on the access rights to customer data of the customer database KDB linked to this work area. In the extraction 5b of the customer data, only such customer data as corresponds to the agent profile AP is taken from the customer database KDB. The extracted customer data thus represents a collection of necessary information corresponding to the work area of the agent.

The CTI instance CTII generates a customer data document KDD from this and a specific URL assigned to the customer data document KDD, with parameters for access rights corresponding to the agent profile AP being assigned to the customer data document KDD, and in procedural step 6 the URL is passed to the call center forwarding CCR. Furthermore, in procedural step 7, which takes place at the same time, the customer data document KDD together with the URL and the access parameters of the agent profile AP are transmitted to a webserver WS that acts as a working data memory.

In parallel with this, the call center forwarding CCR, in procedural step 8, transmits the URL to the agent workstation AWP. There, the URL is displayed and thus signals that the customer data document KDD is ready for processing on the webserver WS.

The customer data document KDD can be called up from the webserver WS by the URL. Because the customer data document KDD is present in the HTML language and a URL is assigned to this, access takes place in procedural step 9 by using a web browser installed on the agent workstation AWP. By using the web browser, that addresses the URL via a link, the URL is transmitted to the webserver WS.

Finally in procedural step 10, the customer data document KDD is transmitted to the agent workstation AWP and is available there in advance, so that when a connection 11 is later established between the caller AR and agent workstation AWP, the customer data of the caller AR is already available to the agent for processing.

If the call is put through immediately to other ACD components without a delay in a queue WAIT, a coupling between voice-controlled operation by the caller AR and the ACD components and creation of caller-specific customer data documents KDD is possible. A procedure of this kind is described in the following.

After performing procedural steps 1 and 2, already described, the caller is connected by the call center forwarding CCR, in procedural step 3b, to the interactive voice response unit IVR. From the voice-supported communication between the interactive voice response unit IVR and the caller AR, the interactive voice response unit IVR generates data words known by the term IVR Item and passes this on to the CTI instance CTII in procedural step 4.

Within the CTI instance CTII, on the basis of the IVR Items, caller-specific search parameters are generated for selection of caller-specific data taking account of the agent profile AP in conjunction with the generation of the URL. Procedural steps 6 to 10, already described, then take place.

A further possibility for performing a search and selection procedure of caller-specific data from the customer database KDB is by coupling the CTI instance CTII with a DNIS system on one hand and the customer database KDB on the other.

The DNIS system is then activated if a caller AR by a selected number attempts to establish a connection to a sub department of the call center and thus to a specific agent workstation AWP. In this case, the caller AR selects a special agent workstation AWP by a specific call number. This call number is passed on via the call center forwarding CCR to the CTI instance CTII and there is analyzed by the DNIS system. On the basis of the call number selected by the caller AR, the DNIS system generates control characters for switching a connection between the caller AR and an agent workstation AWP. The customer data obtained from the customer database KDB in steps 5a and 5b and the customer data document KDD generated from this, are compared with one of the agent profiles AP assigned to one of the special agent workstations AWP with regard to its access parameters and data content, by using the control character of the DNIS system. As in the preceding example, a URL assigned to the customer data document KDD is transmitted to the particular agent workstation AWP.

FIG. 2 is a block diagram showing a further form of embodiment of the method. In contrast to the variants of the method shown in FIG. 1, no URL is given by the CTI instance CTII but instead the CTI instance CTII serves only for the specification of data content and access parameters of the customer data document KDD created on the basis of an assignment of caller data from the call number identification ANI, the interactive voice response unit IVR or the DNIS service for a specified totality of agent profiles AP1, AP2, ..., APn, as well as for switching the customer data document KDD to an external webserver WS. Compared to the example shown in FIG. 1, the webserver can be operated as a server for data management and storage independent of both the components of the automatic call distribution ACD and the agent workstation AWP.

Procedural steps 1 to 5a, already described, take place similar to the steps described in FIG. 1. In contrast to the procedural steps from FIG. 1, the CTI instance CTII assigns the caller data and the customer data extracted in procedural step 5a to a totality of specified agent profiles AP1, ..., APn. In the example of an embodiment shown in FIG. 2, the result of this assignment operation is that the extracted customer data and the caller data correspond to an agent profile AP2 with regard to the work area described under this profile. The created customer data document KDD thus contains access parameters according to the agent profile AP2 and is transmitted in procedural step 7 to the webserver where it is stored, with the webserver assigning a URL address for this customer data document KDD. The presence of the customer data document KDD is signaled to the agent workstation AWP by a communication link, for example a leased line, whereby if the agent profile AP2 at a special agent workstation AWP matches the set of access parameters specified by the agent profile AP2, the customer data document KDD displayed under the transmitted URL is released for access.

Agent profiles AP1, ..., APn can be linked linearly with access rights that are equal but different, and also represent hierarchically graded access rights. It is thus conceivable to assign different part profiles in the form of a tree structure to an agent profile AP1, that are valid in each case for different individual agents, with the agent profile AP1 permitting access to all the customer data documents of all individual part profiles. It is thus possible to configure an agent structure of a call center relative to the access rights of the customer data document KDD and thus stipulate and change security levels in the vertical and horizontal hierarchy.

The method is not limited to the examples of embodiments shown here, but instead can be expanded within the context of technical procedures. This applies particularly to applications in type-related areas comparable with the call center, such as contact centers with equipment for a chat, interaction between agent and caller via a communication network or call switching practiced by specialists under the terms "outbound" or "outbound calling".

In the illustration, independant of the present concrete variants of the method, a data access boundary 12 is always maintained between the data amount present in the customer database KDD and that which can be accessed from the agent workstation AWP. This is shown in the illustration by a dotted line. From the start, the agent workstation AWP can only access the customer data document KDD within the webserver WS supplied from the ACD arrangement with data, whereby the variants of the method described always determine what customer data is passed by the ACD arrangement into a customer data document KDD and transmitted on the webserver WS.

The invention has been described in detail with particular reference to preferred embodiments thereof and examples, but it is understood that variations and modifications can be effected within the spirit and scope of the invention.

What is claimed is:

1. A method for managing data in automatic call distribution system, comprising a call center forwarding, a CTI instance for receiving control of a customer call from the call center forwarding directly and/or though an interactive voice response unit, a customer database accessible from the CTI instance, and an agent workstation communicating with the CTI instance, the method comprising:

transmitting caller data from the call center forwarding and/or the interactive voice response unit to the CTI instance;

extracting customer data from the customer database by the CTI instance on the basis of the caller data and an access level according to an agent profile stored in the CTI instance;

formatting the customer data in a customer data document by the CTI instance, the customer data being formatted in accordance with the access level assigned to an agent corresponding to the agent profile and having access to the agent workstation; and providing the agent with the customer data document through the agent workstation, wherein the access level is one of a plurality of graded access rights, during a booking-in process of the agent and/or the agent workstation, the agent profile is activated, which identifies previously-specified access rights to customer information, and the customer data document is generated from the customer data by matching the access rights to the activated agent profile.

2. A method for managing data in automatic call distribution system, comprising a call center forwarding, a CTI instance receiving call control directly from the call center forwarding and/or though an interactive voice response unit, a customer database accessible from the CTI instance, and an agent workstation, the method comprising:

transmitting caller data from the call center forwarding and/or the interactive voice response unit to the CTI instance;

extracting customer data from the customer database by the CTI instance on the basis of the caller data;

formatting the customer data in a customer data document by the CTI instance, the customer data being formatted in accordance with an access level assigned to an individual agent having access to the agent workstation; and providing the agent with the customer data document through the agent workstation, wherein all customer data is associated with one or more access levels identifying types of agents that should be allowed access to the customer data, the customer data is selected to determine data having an access level that matches the access level of an individual agent, and the customer data document is assembled by compiling the data having a matching access level.

3. The method in accordance with claim 1, wherein an access address is assigned to the customer data document, which address refers to an area of a working memory occupied by the customer data document, and the access address of the customer data document is transmitted to the agent workstation.

4. The method in accordance with claim 1, wherein the customer data document is buffer stored in a working data memory, the working data memory is independent of the customer database, and the agent workstation accesses the customer data document from the working data memory.

5. The method in accordance with claim 4, wherein the customer data document is created as a HTML document, the working data memory is a webserver, a URL address is assigned to the HTML document, and the URL address is transmitted to the agent workstation to provide the agent with the customer data document.

6. The method in accordance with claim 1, wherein the customer data document is created in a markup language, and the agent is provided with the customer data document from the agent workstation by a browser for the markup language.

7. The method in accordance with claim 6, wherein the customer data document is created as an HTML document, and the browser is an HTML browser.

8. The method in accordance with claim 7, wherein a URL address is permanently assigned to the agent workstation, the customer data document created as an HTML document is stored in a server assigned to the agent workstation, the server has an "update" function, the "update" function is triggered by a connection of a caller to the agent workstation, and the customer data document is opened by triggering the "update" function.

9. A method in accordance with claim 1, wherein the customer data document is provided to the agent independently from the customer database.

10. A system for an automatic call distribution, comprising:

a call center forwarding unit to forward caller data regarding a caller, a CTI instance unit comprising:

a first converting device to convert caller data into search parameters for searching customer data in a customer database;

a second converting device to convert a first data format of the customer data retrieved using the search parameters from the customer database to a second data format of a customer data document, and to create the customer data document so that it contains information matching access rights of an agent who will address the caller;

a working data memory to store the customer data document independent from the customer database; and an information provision unit to provide the agent with access to the customer data document, wherein the access rights of an agent who will address the caller are defined by an access profile stored in the CTI instance unit, and the system further comprises an assignment device to assign the customer data document to at least one agent profile.

11. The system in accordance with claim 10, wherein the caller data is determined from an automatic call number identification unit.

12. The system in accordance with claim 10, further comprising an interactive voice response unit to determine caller data from an automated telephone dialogue.

13. The system in accordance with claim 10, wherein the first converting device converts caller data from a DNIS system into search parameters for a search operation of customer data in the customer database.

14. The system in accordance with claim 10, wherein the second converting device converts the first data format into a markup language.

15. The system in accordance with claim 14, wherein the second converting device converts the first data format into an HTML markup language.

16. The system in accordance with claim 10, wherein
the information provision unit creates an access address of the customer data document, and
the access address is a URL address.

17. The system in accordance with claim 10, wherein
the agent accesses the customer data document through an agent workstation,
a URL address is permanently assigned to the agent workstation,
the agent workstation has an "update" function, and
the customer data document corresponding to the URL address is opened when the caller is connected to the agent workstation.

18. The system in accordance with claim 10, wherein
the working data memory is a webserver external to the customer database
the customer data document is stored in the webserver as HTML data, and
the agent is provided with the customer data document from the webserver through a URL address.

* * * * *